United States Patent
Cahill

(10) Patent No.: US 10,447,732 B2
(45) Date of Patent: Oct. 15, 2019

(54) IDENTIFYING URL TARGET HOSTNAMES

(71) Applicant: FACEBOOK, INC., Menlo Park, CA (US)

(72) Inventor: Conor P. Cahill, Waterford, VA (US)

(73) Assignee: Facebook, Inc., Menlo Park, CA (US)

( * ) Notice: Subject to any disclaimer, the term of this patent is extended or adjusted under 35 U.S.C. 154(b) by 200 days.

(21) Appl. No.: 14/839,669

(22) Filed: Aug. 28, 2015

(65) Prior Publication Data

US 2015/0373047 A1 Dec. 24, 2015

Related U.S. Application Data

(63) Continuation of application No. 14/746,657, filed on Jun. 22, 2015, now abandoned, which is a
(Continued)

(51) Int. Cl.
| | |
|---|---|
| *G06F 3/00* | (2006.01) |
| *G06F 3/048* | (2013.01) |
| *H04L 29/06* | (2006.01) |
| *H04L 29/08* | (2006.01) |
| *G06F 21/31* | (2013.01) |

(Continued)

(52) U.S. Cl.
CPC ...... *H04L 63/1483* (2013.01); *G06F 16/9558* (2019.01); *G06F 16/9566* (2019.01); *G06F 16/9577* (2019.01); *G06F 17/24* (2013.01); *G06F 21/31* (2013.01); *H04L 29/0809* (2013.01); *H04L 67/02* (2013.01)

(58) Field of Classification Search
CPC .............. H04L 63/1466; H04L 63/145; H04L 63/1441; H04L 67/22; H04L 9/3268; H04L 63/1483; H04L 63/1491; H04L 51/12; H04L 29/0809; G06F 21/566; G06F 17/24; G06F 17/30882; G06F 17/30887; G06F 17/30905; G06F 21/31
USPC ........................................................ 715/711
See application file for complete search history.

(56) References Cited

U.S. PATENT DOCUMENTS

| | | |
|---|---|---|
| 5,790,793 A | 8/1998 | Higley |
| 5,812,769 A | 9/1998 | Graber et al. |
| | (Continued) | |

OTHER PUBLICATIONS

U.S. Appl. No. 14/746,657, filed Jun. 22, 2015, Cahill.
(Continued)

*Primary Examiner* — Tadesse Hailu
(74) *Attorney, Agent, or Firm* — Keller Jolley Preece

(57) ABSTRACT

Techniques are provided for displaying a uniform resource locator (URL) to assist a user in determining whether a URL destination is what the user expects. A link is presented for selection to a user, and a URL corresponding to the link is accessed. A portion of the URL that corresponds to a hostname component of the URL may be identified, and the URL may be displayed. The hostname component of the URL is visually distinguished from other components of the URL. In addition to or as an alternative to displaying the URL and visually distinguishing the hostname component, a warning message relating to the hostname portion of the URL may be displayed. The techniques may be implemented as a software plug-in or in any type of software application that is capable of recognizing URLs.

20 Claims, 6 Drawing Sheets

Related U.S. Application Data continuation of application No. 13/618,578, filed on Sep. 14, 2012, now Pat. No. 9,092,544, which is a continuation of application No. 13/466,005, filed on May 7, 2012, now Pat. No. 8,943,414, which is a continuation of application No. 12/403,779, filed on Mar. 13, 2009, now Pat. No. 8,176,430, which is a continuation of application No. 10/675,781, filed on Sep. 30, 2003, now Pat. No. 7,526,730.

(60) Provisional application No. 60/483,941, filed on Jul. 1, 2003.

(51) Int. Cl.
*G06F 16/955* (2019.01)
*G06F 16/957* (2019.01)
*G06F 17/24* (2006.01)

(56) References Cited

U.S. PATENT DOCUMENTS

| | | | |
|---|---|---|---|
| 5,870,546 A | 2/1999 | Kirsch et al. | |
| 5,924,104 A | 7/1999 | Earl | |
| 5,961,591 A | 10/1999 | Jones et al. | |
| 5,977,969 A | 11/1999 | DiAngelo | |
| 5,987,482 A | 11/1999 | Bates et al. | |
| 6,021,435 A | 2/2000 | Nielsen | |
| 6,041,324 A * | 3/2000 | Earl | G06F 17/30887 |
| 6,081,900 A | 6/2000 | Subramaniam et al. | |
| 6,092,178 A * | 7/2000 | Jindal | H04L 29/12009 712/27 |
| 6,189,030 B1 | 2/2001 | Kirsch et al. | |
| 6,490,626 B1 | 12/2002 | Edwards et al. | |
| 6,585,776 B1 | 7/2003 | Bates et al. | |
| 6,594,696 B1 | 7/2003 | Walker et al. | |
| 6,668,276 B1 | 12/2003 | Ohkado et al. | |
| 6,907,525 B2 | 6/2005 | Pazi et al. | |
| 6,973,505 B1 * | 12/2005 | Schneider | G06F 17/30887 707/E17.115 |
| 7,058,978 B2 | 6/2006 | Feuerstein et al. | |
| 7,080,158 B1 | 7/2006 | Squire | |
| 7,136,849 B2 | 11/2006 | Patrick | |
| 7,136,932 B1 * | 11/2006 | Schneider | H04L 29/12594 709/217 |
| 7,360,210 B1 | 4/2008 | Vacanti et al. | |
| 7,392,312 B1 | 6/2008 | Philyaw | |
| 7,526,730 B1 | 4/2009 | Cahill | |
| 8,176,430 B1 | 5/2012 | Cahill | |
| 8,943,414 B2 | 1/2015 | Cahill | |
| 9,092,544 B2 | 7/2015 | Cahill | |
| 2001/0056405 A1 * | 12/2001 | Muyres | G06F 21/10 705/52 |
| 2002/0057299 A1 * | 5/2002 | Oren | G06F 17/30899 715/825 |
| 2002/0059364 A1 * | 5/2002 | Coulthard | G06F 21/128 709/203 |
| 2002/0087559 A1 | 7/2002 | Pratt | |
| 2002/0099723 A1 | 7/2002 | Garcia-Chiesa | |
| 2002/0147788 A1 * | 10/2002 | Nguyen | G06F 17/30902 709/217 |
| 2002/0156917 A1 | 10/2002 | Nye | |
| 2002/0163545 A1 * | 11/2002 | Hii | G06F 3/0483 715/838 |
| 2003/0023582 A1 * | 1/2003 | Bates | G06F 17/30887 |
| 2003/0023878 A1 * | 1/2003 | Rosenberg | H04L 63/126 726/4 |
| 2003/0041143 A1 * | 2/2003 | Ronald | H04L 29/06 709/224 |
| 2003/0046361 A1 | 3/2003 | Kirsch et al. | |
| 2003/0074400 A1 * | 4/2003 | Brooks | G06F 17/30867 709/203 |
| 2003/0098882 A1 * | 5/2003 | Cowden | G06F 9/4443 715/781 |
| 2003/0101242 A1 | 5/2003 | Cowden et al. | |
| 2003/0131060 A1 | 7/2003 | Hartselle et al. | |
| 2004/0068542 A1 * | 4/2004 | Lalonde | G06Q 10/107 709/206 |
| 2004/0078422 A1 * | 4/2004 | Toomey | G06F 21/6218 709/202 |
| 2004/0123157 A1 * | 6/2004 | Alagna | G06F 21/606 726/8 |
| 2004/0128552 A1 * | 7/2004 | Toomey | G06F 21/57 726/22 |
| 2004/0169685 A1 | 9/2004 | Kubala | |
| 2004/0177152 A1 | 9/2004 | Aviran | |
| 2004/0189693 A1 | 9/2004 | Kenig | |
| 2005/0022008 A1 | 1/2005 | Goodman et al. | |
| 2005/0102274 A1 | 5/2005 | Chen | |
| 2005/0235203 A1 * | 10/2005 | Undasan | G06F 17/212 715/205 |
| 2006/0218242 A1 | 9/2006 | Tock et al. | |

OTHER PUBLICATIONS

U.S. Appl. No. 10/675,781, filed Jan. 25, 2007, Office Action.
U.S. Appl. No. 10/675,781, filed Jul. 17, 2007, Office Action.
U.S. Appl. No. 10/675,781, filed Jan. 10, 2008, Office Action.
U.S. Appl. No. 10/675,781, filed May 12, 2008, Office Action.
U.S. Appl. No. 10/675,781, filed Dec. 17, 2008, Notice of Allowance.
U.S. Appl. No. 12/403,779, filed Aug. 8, 2011, Office Action.
U.S. Appl. No. 12/403,779, filed Jan. 6, 2012, Notice of Allowance.
U.S. Appl. No. 13/466,005, filed May 1, 2014, Office Action.
U.S. Appl. No. 13/466,005, filed Sep. 17, 2014, Notice of Allowance.
U.S. Appl. No. 13/618,578, filed Feb. 24, 2014, Office Action.
U.S. Appl. No. 13/618,578, filed May 19, 2014, Notice of Allowance.
U.S. Appl. No. 14/746,657, filed May 25, 2017, Office Action.

* cited by examiner

FIG. 5

*Fidelity Investments - Microsoft Internet Explorer provided by Fish and Richardson P.C.*

File  Edit  View  Favorites  Tools  Help

Back ▾ | ⊗ | Search | Favorites | Media | ...

Address [ http://www.fidelity.com/homepage@display.fakesite.com/home.html ] ▾  Go | Links >>

— 505

Fidelity.com | LOGIN | Home | Open an Account | Help | [SEARCH] | GET QUOTE

My Fidelity | Accounts & Trade | Quotes & Research | Planning & Retirement | Products | Customer Service

Quick Links
- Log in to NetBenefits℠  ← 510
- Get Started
- Open An Account
- Research Mutual Funds

Products
- Mutual Funds
- Fixed Income
- Brokerage
- Retirement Accounts
- Rollover IRAs
- Annuities
- Life Insurance

Featured Services
- Tax Center
- Employee Stock Plans
- FundsManager Program
- Active Trader

Why choose Fidelity? Let us help you trade, plan, and manage your finances. Call a Fidelity Representative at 800- Fidelity

New and Noteworthy
- Loads Removed on Five Popular Fidelity Funds:
- All Diversified Stock Funds Now No-Load
- Well-Known, Established Stocks at Value Prices;
- That's the Strategy of New Blue Chip Value Fund
- Ernst & Young Special Report on New Tax Law

Fidelity Investor's Weekly
- Suze Orman: Five Tips for Young Invesors

Quick Tiip
- Get Help Picking a Mutual Fund

Fidelity SPOTLIGHT

*Fidelity Investments*

Tuesday, July 16, 2003

Dow Jones Industries
9,300
9,200
9,100
9,000
11    1    3

⇩ DJIA         9,126.97   -48.18
⇩ NASDAQ      1,753.28    -1.54
⇩ S&P 500     1,000.42    -3.44
⇩ Russell 3000   563.69   -2.17
4:04 PM ET 7/15/03    @BigCharts.com
Today's Market News

Fidelity's Sites for
NetBenefits℠ Customers 401(k)403(b) accounts and employee benefits
Employers and Plan Sponsors
Advisors and Investment Professionals
Broker-Dealers, RIA's and Plan Administrators Internet http://www.fidelity.com/homepage@display.FAKESITE.COM/netbenefits.html  ← 515

500

IDENTIFYING URL TARGET HOSTNAMES

CLAIM OF PRIORITY

The present application is a continuation of U.S. application Ser. No. 14/746,657, filed Jun. 22, 2015, which is a continuation of U.S. application Ser. No. 13/618,578, filed Sep. 14, 2012, which is now issued as U.S. Pat. No. 9,092,544, which is a continuation of U.S. application Ser. No. 13/466,005, filed May 7, 2012, which is now issued as U.S. Pat. No. 8,943,414, which is a continuation of U.S. application Ser. No. 12/403,779, filed Mar. 13, 2009, which is now issued as U.S. Pat. No. 8,176,430, which is a continuation of U.S. application Ser. No. 10/675,781, filed Sep. 30, 2003, which is now issued as U.S. Pat. No. 7,526,730, which claims the benefit of and priority to U.S. provisional application No. 60/483,941, filed Jul. 1, 2003. Each of the aforementioned patent(s) and application(s) are hereby incorporated by reference in their entirety.

TECHNICAL FIELD

This description relates to interpreting uniform resource locators (URLs), for example, to identify a host component of a URL.

BACKGROUND

Hyperlinks in electronic documents, such as web pages, emails, and word processing documents, frequently contain links to URLs. When a user clicks on a hyperlink that has an associated URL, a web page corresponding to the URL may be automatically opened in a browser application. A user may be misled by a spoofing hyperlink (e.g., in spam emails) that purports to link to a particular website or subject matter but that actually links to a different website or subject matter. Thus, users intending to access a trusted website or desired subject matter may be re-routed against their wishes and without their knowledge.

For example, a hyperlink that reads "Click here to go to Ebay" may actually be associated with a URL that redirects the user to a destination that is not affiliated with the "ebay.com" domain name. The destination may be designed to look like the Ebay website but may be used in an attempt to gain unauthorized access to a user's personal or confidential information. If the redirected user believes that she is accessing the actual Ebay website, the user may be willing to enter a user name and password or other personal information. As a result, the user may unknowingly provide confidential information to an unauthorized entity or person.

SUMMARY

Techniques are provided for helping users identify a hostname component of target URLs. By alerting users to the true hostname component of a URL, it is possible to substantially reduce the chances of a user being spoofed into thinking she is at a web site that is different than what the user believed it to be. Users can be alerted using a warning message and/or by displaying a URL with a hostname component visually distinguished from other components of the URL.

In one general aspect, a URL corresponding to a link presented for selection to a user is accessed. A portion of the URL that corresponds to a hostname component of the URL may be identified, and the URL may be displayed with the hostname component of the URL visually distinguished from other components of the URL.

Implementations may include one or more of the following features. For example, an electronic document may be displayed, and the link may be presented contemporaneously with the electronic document. A software application that is used to display the electronic document may automatically identify the portion of the URL that corresponds to the hostname component of the URL. The hostname component of the URL may be visually distinguished from other components of the URL when a pointer is positioned over the link in the electronic document or when the link is selected.

The link may be selected through manipulation of a pointing device, such as by clicking on the link using a middle button on a mouse. A warning message may be displayed in response to the user selection of the link. The warning message may require a response before performing a redirection to the URL. The software application may automatically determine whether the URL is suspicious and may display the warning message only if the URL is determined to be suspicious.

The link may correspond to a selectable button in the electronic document. The software application may be a word processing application, an electronic mail application, an instant messaging application, or a browser. The electronic document may be a word processor file, an electronic mail message, an instant message, or a web page. The hostname component of the URL may be visually distinguished by using display characteristics for the hostname component that differ from display characteristics of other components of the URL. The display characteristics for the hostname component may include a color for the hostname component that differs from a color of other components of the URL; a font style for the hostname component that differs from a font style of other components of the URL; a font size for the hostname component that differs from a font size of other components of the URL; a font type for the hostname component that differs from a font type of other components of the URL; and/or a display effect for the hostname component.

The hostname component of the URL may be visually distinguished by repositioning the hostname component within the displayed URL, such as by displaying the hostname component at the beginning of the displayed URL or by displaying the hostname component of the URL in isolation from the other components of the URL. The URL, with the hostname component of the URL visually distinguished from other portions of the URL, may be displayed in a user interface of a browser application, such as in an address field or a status bar of the browser application user interface. The hostname component of the URL may include a second level domain name and may also include other parts of the overall domain name, such as the first level domain name or everything after an "@" symbol in the URL.

In another general aspect, a URL corresponding to a link presented for selection to a user is accessed. A portion of the URL that corresponds to a hostname component of the URL may be identified, and a warning message relating to the hostname component of the URL may be displayed. In some implementations, one or more of the following features may be included. For example, a user may be required to acknowledge the hostname component of the URL before providing access to an electronic file identified by the URL. A software application may automatically identify the portion of the URL that corresponds to the hostname component. The warning message may identify the hostname component of the URL. The warning message may display the entire URL but may visually distinguish the hostname component of the URL from other components of the URL. The warning message may be displayed in response to a selection of the link.

The described techniques may be implemented as a method, in a system, or in instructions stored on a machine-readable medium for causing one or more processors to perform certain operations.

The details of one or more implementations of the invention are set forth in the accompanying drawings and the description below. Other features will be apparent from the description and drawings, and from the claims.

DESCRIPTION OF DRAWINGS

FIG. 5 is an illustrative example of a user interface for a browser application.

Like reference symbols in the various drawings indicate like elements.

DETAILED DESCRIPTION

Figure 1:
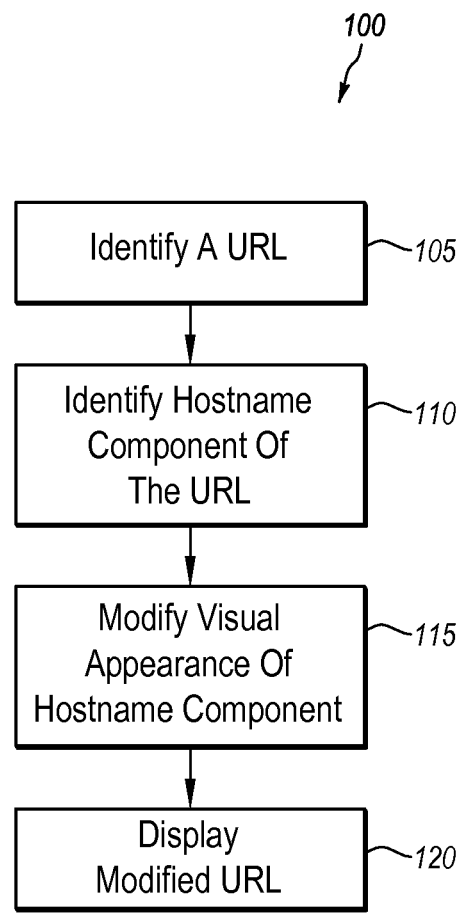
FIG. 1 is a flow diagram of a process for alerting users to the true hostname for a URL.

Techniques for alerting users to the true destination of a link in an electronic document may include modifying a URL to visually distinguish a hostname component of the URL and/or presenting users with a warning message identifying the hostname component. One of the mechanisms that may be used to hijack an account or otherwise obtain user information is to provide the user with a link associated with an address or destination not affiliated with the address or destination advertised to the user with respect to the link and presenting the user with an interface at the illegitimate destination which projects authenticity, thereby causing the user to think he is at a trusted site where he can safely enter his data. Such links may be presented in the form of a hyperlink, a clickable button, or a URL that disguises the true domain name or hostname component of the URL.

Although security personnel at a company or Internet service provider may routinely advise users to validate any URL that they are using to verify that the URL links to the intended destination, some convenience components in the URL make this difficult for many users. For example, the URL:

http://update.aol.com:subscription@hackers.ru/userform.html may look like it refers to a site for updating a user subscription within AOL because it contains "aol.com" toward the beginning of the URL. However, the URL actually refers to a site in Russia (hackers.ru).

To help prevent users from being deceived or misled regarding the actual site they are visiting, a hostname component of the URL may be highlighted in some manner to distinguish the hostname component from other components of the URL. The hostname component may include only the second level domain name (i.e., "hackers" in the above example), the first and second level domain names (i.e., "hackers.ru" in the above example), everything following the "@" symbol, or some more complete representation of the domain name (e.g., www.hackers.ru). In addition to the hostname component, the URL may also include path names (e.g., "userform.html"), port names, or entirely irrelevant (with respect to the actual identity of the true host) or unnecessary information (e.g., "update.aol.com:subscription" in the above example). The hostname component of the URL may be highlighted using any means of distinguishing the display characteristics of the hostname component from the other components of the URL, such as using color, changing the font style (e.g., using bold or italics), changing the display effects (e.g., using all caps or text outlining), and the like. For example, the hostname component may be highlighted by changing the color of the text, changing the color of the background for the hostname component, using all caps, using bold type, using italics, changing the font type, and changing the font size.

As another alternative, the hostname component may be separated from the URL and repositioned at the beginning of the URL (e.g., by displaying:

"hackers.ru—http://update.aol.com:
subscription@hackers.ru/userform.html" or
"hackers.ru—http://update.aol.com:subscription@[
]/userform.html").

FIG. 1 is a flow diagram of a process 100 for alerting users to the true hostname for a URL. Initially, a URL is identified (step 105), and a hostname component of the identified URL is then itself identified (step 110). The appearance of the hostname component is modified to visually distinguish the hostname component from other components of the URL (step 115), and the modified URL is then displayed to the user (step 120).

Figure 2:
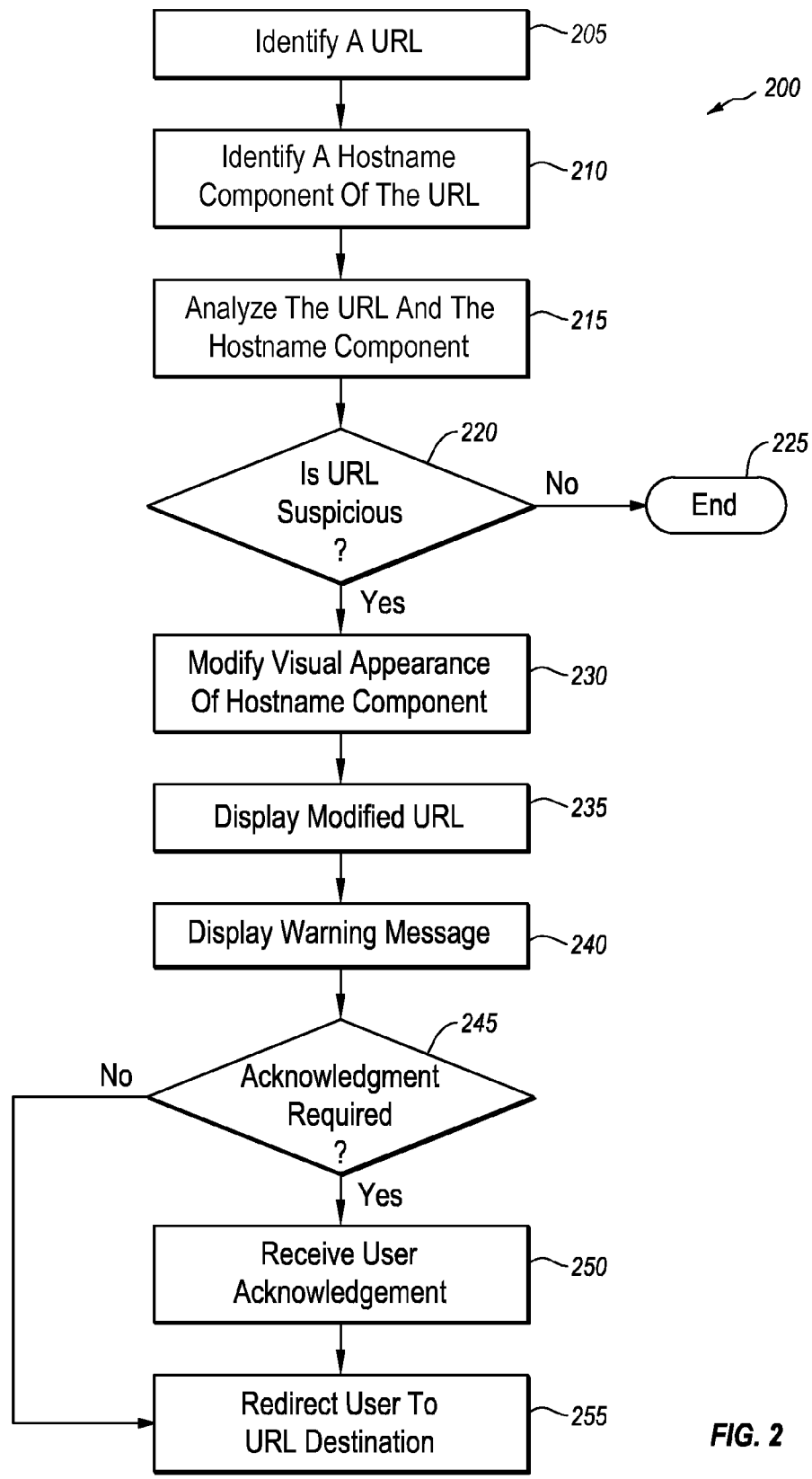
FIG. 2 is a flow diagram of another process for alerting users to the true hostname for a URL.

FIG. 2 is a flow diagram of another process 200 for alerting users to the true hostname for a URL. Initially, a URL is identified (step 205). The URL may appear in an electronic document, such as a word processor file, an electronic mail message, an instant message, or a web page, which may or may not be displayed to a user who accesses the electronic document. For instance, electronic documents often include a selectable link that embeds a URL, where the embedded URL often is not immediately apparent to a user.

A software application that enables the user to view the electronic document generally displays and allows selection of the link, and automatically identifies the URL associated therewith. The software application may be, for example, a browser application, an email application, an instant messaging application, or a word processing application.

A hostname component of the identified URL is then itself identified (step 210). The hostname component may be identified by the software application automatically. Alternatively, the hostname component may be identified automatically by a different software application, such as a plug-in. In general, software code can be written to perform the automatic identification in much the same way as a domain name is extracted from a URL to convert it into a numerical host address. Such software code can be written into a browser, email, or other application or can be implemented as a plug-in that interfaces with an existing application to provide the functionalities described herein.

In some implementations, the URL and the hostname component may be analyzed (step 215) by the software application. This analysis may be performed to identify whether the URL contains indications that it is meant to spoof users. For example, the URL may be analyzed to determine if the hostname component is buried deep within the URL (i.e., if the URL contains a significant number of components that appear before the actual hostname component). An example of burying the hostname deep within the URL is shown by http://update.aol.com:subscription@hackers.ru/user.form.html, in which the hostname "hackers.ru" is preceded by a significant number of components. The URL http://www.hackers.ru, on the other hand does not bury the hostname deep within the URL. The URL may also be analyzed to determine if the URL includes phony hostname components (i.e., if the URL contains what looks like a domain name but that does not serve as a domain name for the URL). For instance, the component "aol.com" in the above URL appears to be a hostname but does not act as a hostname for that particular URL. On the other hand, the URL http://update.aol.com does not have the same problem and generally would not trigger a warning for a phony hostname. The URL may also be analyzed to determine if the URL contains a hostname component that does not appear to bear any resemblance to information in the link with which the URL is associated. For example, a hyperlink may display the URL http://www.bestbuy.com but may actually link to the URL http://www.digitalgamma.com in which case the URL may be flagged to warn the user of the suspicious nature of the URL.

Based on the analysis of the URL and the hostname component, it may be determined if the URL is suspicious (step 220). Again, this determination may be made automatically by the software application. If the URL is not suspicious, the process 100 may end (step 225). In some implementations, however, it may be desirable to display the hostname component in a visually distinguishable manner even if the hostname is not determined to be suspicious. In fact, some implementations may not include an attempt to determine whether the URL is suspicious. Instead, such implementations may display the hostname component in a visually distinguishable manner for all URLs.

Next, the appearance of the hostname component may be modified to visually distinguish the hostname component from other components of the URL (step 230) prior to displaying the URL to the user. This modification may involve using display characteristics for the hostname component that differ from the display characteristics of other components of the URL, such as using color, changing the font style (e.g., using bold or italics), changing the display effects (e.g., using all caps or text outlining), and the like. For example, the hostname component may be highlighted by changing the color of the text, changing the color of the background for the hostname component, using all caps, using bold type, using italics, changing the font type, and changing the font size. Alternatively or in addition, this modification may involve repositioning the hostname component within the URL, or remotely all or some of the URL components other than hostname. The modified URL may then be displayed to the user (step 235) on a user interface.

The modification of the visual appearance of the hostname component (step 230) and the display of the modified URL (step 235) may be performed, for example, automatically, in response to the user using a mouse to position a pointer over the URL or a link to the URL, in response to a user selecting the URL or a link to the URL (e.g., by right-clicking on the link with a mouse), in response to a user clicking on the URL or a link to the URL using the middle mouse button, or in response to a determination that the URL is suspicious.

Figure 3:
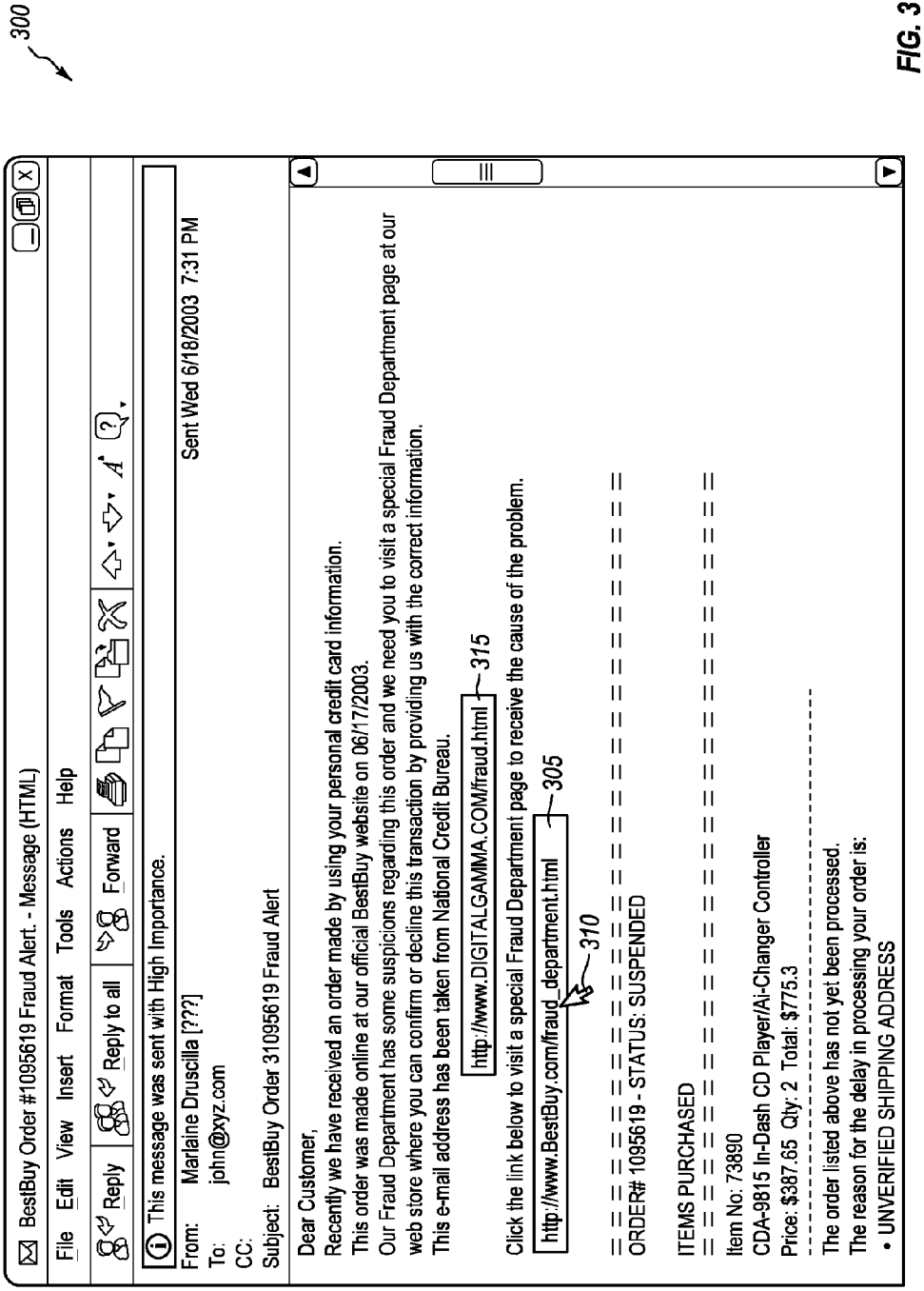
FIG. 3 is an illustrative example of a user interface for an electronic mail application.
Figure 4:
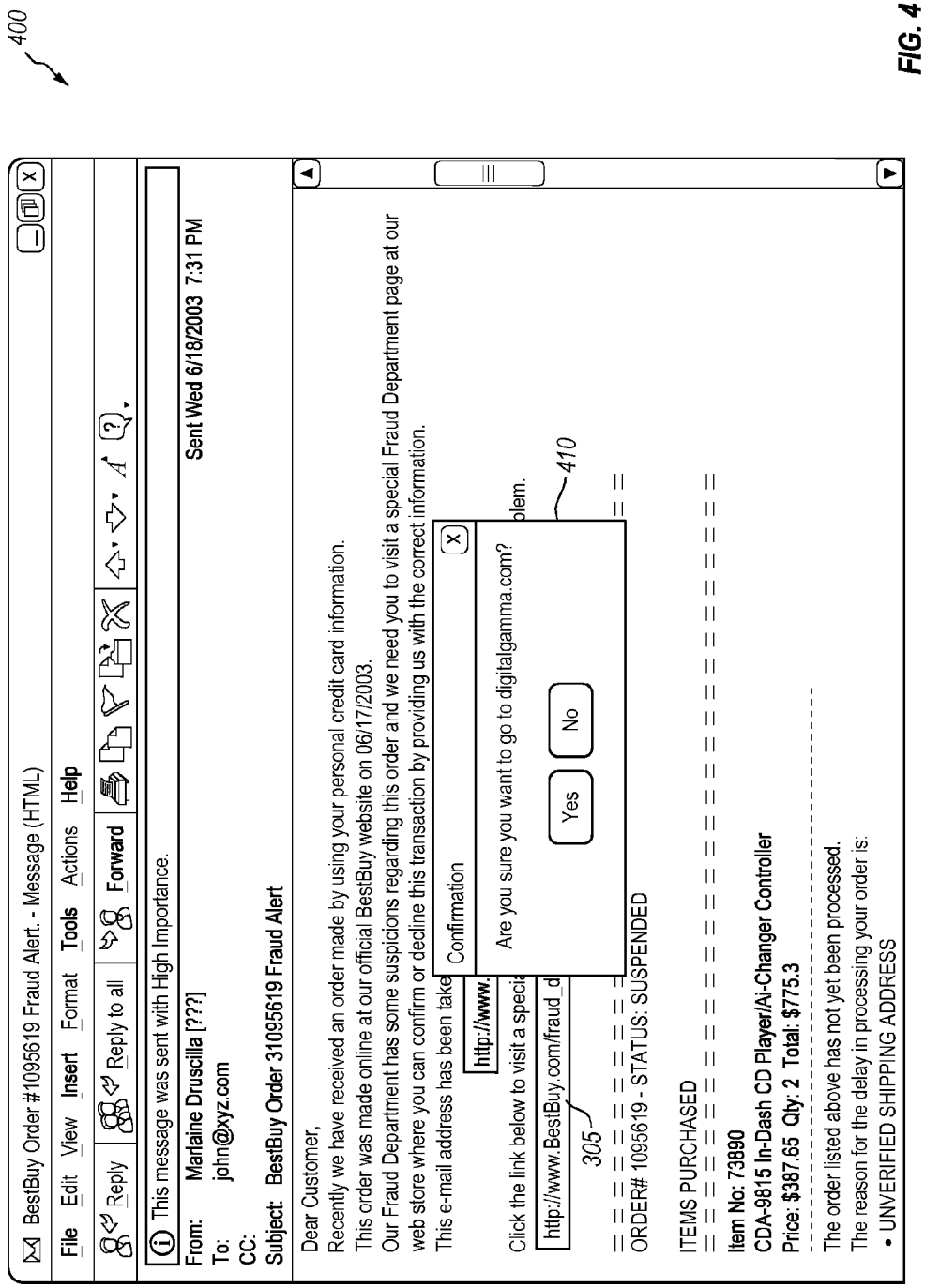
FIG. 4 is an illustrative example of another user interface for an electronic mail application.

In addition to as an alternative to displaying the modified URL, a warning message identifying the true hostname component of the URL may be displayed to the user (step 240) (see FIGS. 3 and 4 for examples of warning messages). The warning message may display the entire URL, the hostname component, and/or display a warning that the selected link is suspicious. The warning message may be included in a banner, message box, or click through form. The warning message may be displayed, for example, automatically, in response to the user positioning a pointer over the URL or a link to the URL for a predefined period of time (e.g., immediately, or after a one (1) second delay), in response to a user taking steps to invoke the URL or a link to the URL (e.g., by right-clicking on the link with a mouse), in response to a user taking steps to select the URL in a manner other than the steps required to invoke the URL or a link to the URL (e.g., selecting the middle mouse button while the pointer is positioned over the link rather than the right mouse button used to invoke the link), in response to a determination that the URL is suspicious (step 220), or some combination of the aforementioned triggers (e.g., in response to a user attempting to access a URL if where the URL has been determined to be suspicious).

The user may be required to acknowledge the warning by explicitly indicating his desire to proceed (step 245). In the case of a click through form and possibly in other warning messages, this indication may be performed, for example, by clicking in a particular location of a message box (e.g., a "proceed" button). Once a user acknowledgement of the warning message is received (step 250), the user may be redirected to the URL destination (step 255) if the user approves the redirection by clicking on an "accept" button or otherwise indicating acceptance (see FIG. 4).

As an alternative to or in addition to displaying a warning message, the user may be presented with one or more alternative URLs that are selected based on a currently displayed website, characteristics of the link selected by the user (as opposed to the URL associated with that link), the user's viewing or web surfing history, and/or user demographics or interests. For example, when presented with the URL: http://update.aol.com:suvscription@hackers.ru/user-form.html the user may be presented with the option of going to a website associated with the "aol.com" hostname (e.g., http://www.aol.com or http://update.aol.com).

FIG. 3 is an illustrative example of a user interface 300 for an electronic mail application. In this example, an email message is displayed on the user interface 300. The email message includes a hyperlink 305 that appears to be a URL for a Best Buy web page. When a user positions a pointer 310 over the hyperlink 305 (i.e., when the user hovers over the hyperlink 305), a floating window 315 appears that identifies the true URL that is associated with the hyperlink 305. In this case, a hostname component of the true URL is highlighted using all caps, although other mechanisms for visually distinguishing the hostname component, such as altering the display characteristics or repositioning the hostname component as discussed above, may also be used. In addition, as indicated with respect to steps 235 and 240, the display of the floating window 315 may be performed in response to other actions, such as simply viewing the email or clicking on the hyperlink 305 using a middle mouse button. Instead of displaying a floating window 315, other techniques for calling the user's attention to the true hostname component may also be used. For example, the URL with the hostname component visually distinguished may be displayed in a status bar (not shown) at the top or bottom of the user interface when the user hovers a pointer over the hyperlink 305.

FIG. 4 is an illustrative example of another user interface 400 for an electronic mail application. In this example, the email message is the same as in FIG. 3, but the user has clicked on the hyperlink 405. The application may determine that the URL associated with the hyperlink 405 is suspicious because it is different than the URL displayed in the hyperlink 405. In response, the application may display a message box 410 to provide a more active warning to the user. The message box 410 requires the user to acknowledge the suspicious URL by confirming that he wants to go to the web site associated with the hyperlink 405 (i.e., a web site with the domain name "digitalgamma.com").

FIG. 5 is an illustrative example of a user interface 500 for a browser application. In this example, the user interface 500 appears to be a "Fidelity.com" web page. The address bar 505 of the browser, however, displays the true URL of the web page with the hostname component visually distinguished using double underlining to alert the user to the actual host of the web page. In addition to highlighting the hostname component in the address bar 505, a hostname component may also be highlighted in a status bar 515 (e.g., using bold and all caps in this example) when the user hovers a pointer over a hyperlink 510 within the displayed web page. If the user selects a hyperlink 510 that the application determines to be suspicious, a warning message (not shown) may further be generated and displayed on the user interface 500.

Figure 6:
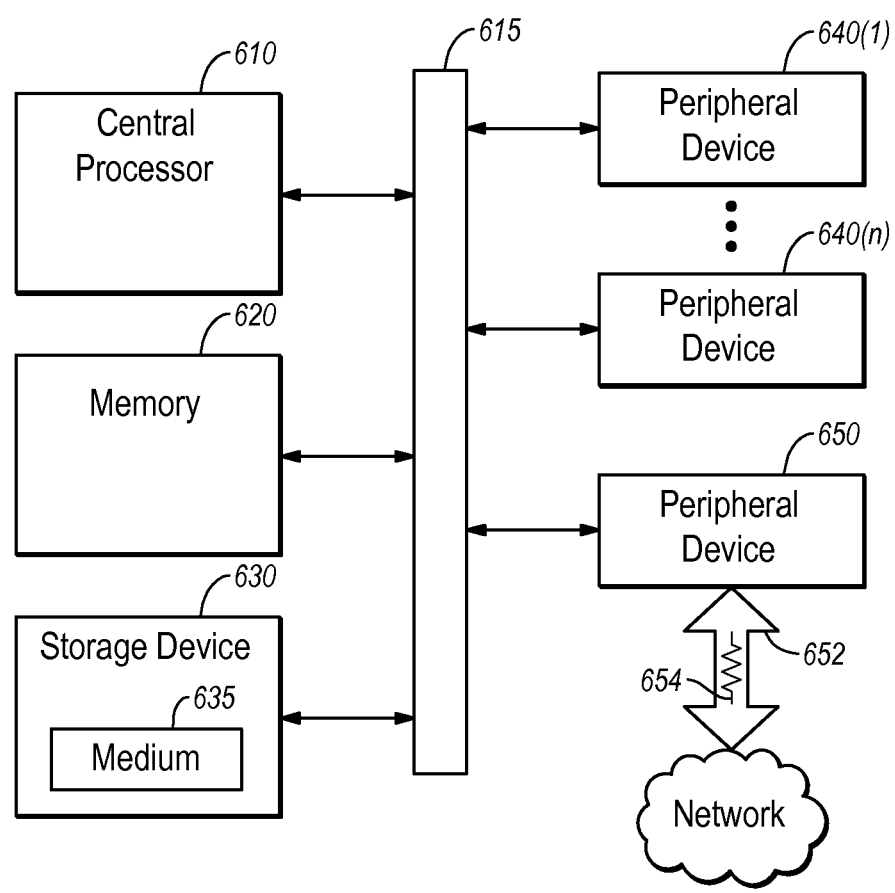
FIG. 6 is a block diagram illustrating an example data processing system in which a system for identifying target URL hostnames may be implemented.

FIG. 6 is a block diagram illustrating an example data processing system 600 in which a system for identifying target URL hostnames may be implemented. The data processing system 600 includes a central processor 610, which executes programs, performs data manipulations and controls tasks in the system 600. The central processor 610 is coupled with a bus 615 that can include multiple busses, which may be parallel and/or serial busses.

The data processing system 600 includes a memory 620, which can be volatile and/or non-volatile memory, and is coupled with the communications bus 615. The system 600 can also include one or more cache memories. The data processing system 600 can include a storage device 630 for accessing a storage medium 635, which may be removable, read-only, or read/write media and may be magnetic-based, optical-based, semiconductor-based media, or a combination of these. The data processing system 600 can also include one or more peripheral devices 640(1)-640(n) (collectively, devices 640), and one or more controllers and/or adapters for providing interface functions.

The system 600 can further include a communication interface 650, which allows software and data to be transferred, in the form of signals 654 over a channel 652, between the system 600 and external devices, networks, or information sources. The signals 654 can embody instructions for causing the system 600 to perform operations. The system 600 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 600 and/or delivered to the machine 600 over a communication interface. These instructions, when executed, enable the machine 600 to perform the features and function described above. These instructions represent controllers of the machine 600 and can be implemented in a high-level procedural and/or object-oriented programming language, and/or in assembly/machine language. Such languages can be compiled and/or interpreted languages.

As used herein, the term "machine-readable medium" refers to any computer program product, apparatus and/or device used to provide machine instructions and/or data to the machine 600, including a machine-readable medium that receives machine instructions as a machine-readable signal. Examples of a machine-readable medium include the storage medium 635, the memory 620, and/or PLDs, FPGAs, ASICs, and the like.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer.

The described techniques and systems may find particular utility in connection with devices that have a limited display capability, such as PDAs with browsers, to provide a warning to an otherwise unknowing user who does not have a full browser display capability. The mode of visually distinguishing or otherwise providing a warning to the user may change based on the capabilities of the display device. For example, a PDA may not be capable of displaying fonts. As a result, the visually distinguished hostname component may be displayed in all caps or using a warning box rather than changing the font.

A number of implementations have been described. Nevertheless, it will be understood that various modifications may be made. For example, many of the steps in the process shown in FIGS. 1 and 2 can be rearranged or omitted. Accordingly, other implementations are within the scope of the following claims.

What is claimed is:

1. A method comprising:
   detecting, using at least one processor, an interaction by a user with a hyperlink corresponding to a uniform resource locator ("URL");
   determining, using the at least one processor, that the hyperlink is configured to mislead the user to associate the hyperlink with a web page;
   identifying, using the at least one processor, an alternative URL to access the web page; and
   providing to the user, using the at least one processor, a selectable option to navigate to the web page using the alternative URL.

2. The method as recited in claim 1, wherein determining that the hyperlink is configured to mislead the user to associate the hyperlink with the web page comprises determining that the hyperlink contains a buried hostname.

3. The method as recited in claim 1, wherein determining that the hyperlink is configured to mislead the user to associate the hyperlink with the web page comprises identifying phony-hostname components within the hyperlink.

4. The method as recited in claim 1, wherein identifying the alternative URL to access the web page comprises:
   identifying one or more characteristics of the URL; and
   identifying the alternative URL based on the identified one or more characteristics of the URL.

5. The method as recited in claim 4, wherein identifying the one or more characteristics of the URL comprises identifying one or more of keywords associated with a corresponding web page for the URL, images associated with the corresponding web page for the URL, or hyperlinks associated with the corresponding web page for the URL.

6. The method as recited in claim 1, wherein identifying the alternative URL to access the web page comprises:

identifying one or more characteristics of a displayed portion of the hyperlink corresponding to the URL; and
identifying the alternative URL based on the identified one or more characteristics of the displayed portion of the hyperlink corresponding to the URL.

7. The method as recited in claim 6, wherein identifying the one or more characteristics of the displayed portion comprises identifying keywords within the displayed portion.

8. The method as recited in claim 1, wherein identifying the alternative URL to access the web page comprises:
analyzing a viewing history associated with the user; and
identifying the alternative URL to access the web page based on the analyzed viewing history associated with the user.

9. The method as recited in claim 8, wherein analyzing the viewing history associated with the user comprises analyzing all web pages visited by the user within a predetermined threshold of time.

10. The method as recited in claim 1, wherein identifying the alternative URL to access the web page comprises:
identifying one or more demographics associated with the user; and
identifying the alternative URL to the web page based on the identified one or more demographics associated with the user.

11. The method as recited in claim 1, wherein identifying the alternative URL to access the web page comprises:
identifying one or more interests associated with the user; and
identifying the alternative URL to access the web page based on the identified one or more interests associated with the user.

12. The method as recited in claim 11, wherein identifying the one or more interests associated with the user comprises analyzing a profile associated with the user to identify the one or more interests associated with the user.

13. The method as recited in claim 1, wherein detecting the interaction by the user with the hyperlink corresponding to the URL comprises detecting one or more of a click, a double-click, a hover, or a touch gesture.

14. A system comprising:
at least one processor; and
at least one non-transitory computer-readable storage medium storing instructions thereon that, when executed by the at least one processor, cause the system to:
detect an interaction by a user with a hyperlink corresponding to a uniform resource locator ("URL");
determine that the hyperlink is configured to mislead the user to associate the hyperlink with a web page;
identify an alternative URL to access the web page; and
provide to the user a selectable option to navigate to the web page using the alternative URL.

15. The system as recited in claim 14, further comprising instructions that, when executed by the at least one processor, cause the system to identify the alternative URL to access the web page by:
identifying one or more characteristics of the URL; and
identifying the alternative URL to access the web page based on the identified one or more characteristics of the URL.

16. The system as recited in claim 14, further comprising instructions that, when executed by the at least one processor, cause the system to identify the alternative URL to access the web page by:
identifying one or more characteristics of a displayed portion of the hyperlink corresponding to the URL; and
identifying the alternative URL to access the web page based on the identified one or more characteristics of the displayed portion of the hyperlink corresponding to the URL.

17. The system as recited in claim 14, further comprising instructions that, when executed by the at least one processor, cause the system to identify the alternative URL to access the web page by:
analyzing a viewing history associated with the user; and
identifying the alternative URL to access the web page based on the analyzed viewing history associated with the user.

18. The system as recited in claim 14, further comprising instructions that, when executed by the at least one processor, cause the system to identify the alternative URL to access the web page by:
identifying one or more demographics associated with the user; and
identifying the alternative URL to access the web page based on the identified one or more demographics associated with the user.

19. The system as recited in claim 14, further comprising instructions that, when executed by the at least one processor, cause the system to identify the alternative URL to access the web page by:
identifying one or more interests associated with the user; and
identifying the alternative URL to access the web page based on the identified one or more interests associated with the user.

20. A non-transitory computer readable medium storing instructions thereon that, when executed by at least one processor, cause a computer system to:
detect an interaction by a user with a hyperlink corresponding to a uniform resource locator ("URL");
determine that the hyperlink is configured to mislead the user to associate the hyperlink with a web page;
identify an alternative URL to access the web page based on one or more characteristics of a displayed portion of the hyperlink; and
provide to the user a selectable option to navigate to the web page using the alternative URL.

* * * * *